United States Patent [19]

Masuda

[11] Patent Number: 4,709,387

[45] Date of Patent: Nov. 24, 1987

[54] MULTIFUNCTIONAL TELEPHONE

[75] Inventor: Shinichi Masuda, Osaka, Japan

[73] Assignee: Sharp Kabushiki Kaisha, Osaka, Japan

[21] Appl. No.: 915,952

[22] Filed: Oct. 3, 1986

Related U.S. Application Data

[63] Continuation of Ser. No. 688,935, Jan. 4, 1985.

[30] Foreign Application Priority Data

May 10, 1984 [JP] Japan .................................. 59-94066

[51] Int. Cl.$^4$ ............................................. H04M 1/26
[52] U.S. Cl. .................................... 379/354; 379/355; 379/356; 340/712
[58] Field of Search .................. 340/712; 379/61, 355, 379/354, 359, 356

[56] References Cited

U.S. PATENT DOCUMENTS

| | | | |
|---|---|---|---|
| 3,879,722 | 4/1975 | Knowlton | 340/712 |
| 3,932,709 | 1/1976 | Hoff et al. | 179/90 K |
| 4,341,929 | 7/1982 | Alexander et al. | 179/90 B |
| 4,385,291 | 5/1983 | Piguet | 340/712 |
| 4,475,013 | 10/1984 | Lee et al. | 179/90 BD |
| 4,481,382 | 11/1984 | Villa Real | 379/61 |
| 4,481,508 | 11/1984 | Kamei et al. | 340/712 |
| 4,503,288 | 3/1985 | Kessler | 179/2 DP |
| 4,503,291 | 3/1985 | Von Holten et al. | 179/90 AN |
| 4,511,764 | 4/1985 | Nakayama et al. | 379/354 |

Primary Examiner—Robert Lev
Attorney, Agent, or Firm—Birch, Stewart, Kolasch & Birch

[57] ABSTRACT

A multifunctional telephone capable of memorizing alphabetical characters and telephone numbers includes digit and function keys and a multi-row display unit. The lower row of the display is capable of displaying three groups of letters, A-I, J-R and S-Z above digits 0-9 printed on the face of the telephone. By pressing a corresponding digit key, a letter may be displayed on the upper row of the display. The upper row of the display is capable of showing a name while the lower row can display a telephone number. After the information has been entered into the telephone, it will be stored in memory. After pressing certain function keys, the telephone can search the memory for all information starting with a certain letter. This information will be sequentially displayed and may be automatically dialed after activation of certain other keys. Rather than displaying alphabet characters, "KATAKANA" characters or other symbols may be shown. Also, other information may be input and stored by the multifunctional telephone.

5 Claims, 6 Drawing Figures

MULTIFUNCTIONAL TELEPHONE

This application is a continuation of application Ser. No. 688,935 filed on Jan. 4, 1985.

BACKGROUND OF THE INVENTION

The present invention relates to a multifunctional telephone capable of memorizing alphabetical characters and telephone numbers related to personal and company names, and more particularly, to input and display means.

Conventionally, there are a variety of multifunctional electronic telephone units capable of inputting alphabetical characters and digital telephone numbers for into a memory, which are typically provided with individual keys called "full keys" that deal with alphabetical characters and other codes plus numerals to allow input of each character and numerals by pressing corresponding keys, or being provided with character keys for allocating plural characters, for example, "ABC" or "DEF" for each character key and a designation key for optionally selecting corresponding characters so that any desired characters or numerals can be input by jointly operating the character keys and the designation key. In addition, a number of these electronic telephone units use display means that randomly display characters and numerals in a row. However, to securely arrange the full key system on a small unit like a telephone, the area to be occupied by individual keys should be minimized, and then this will incur much inconvenience to the user when pressing these keys. Conversely, if the size of individual keys were enlarged to provide the user with an easier key operation, the entire area to be occupied by the full key system must also be enlarged, thus eventually causing the total size of a telephone unit to become larger, resulting in higher cost. In particular, when a character key deals with plural characters or numerals, each key must be pressed more than twice for inputting each character before all the needed characters are entered. This requires a number of key operations to allow entry of each designated character and causes much inconvenience on the part of the user due to complex key input operations.

OBJECT AND SUMMARY OF THE INVENTION

The present invention provides means for allocating the digital keys of a telephone with alphabetical characters, "KATAKANA" Japanese characters and codes by applying a push-pull dialer having digital and functional keys that are provided for any conventional telephone unit, and in addition, it also provides a display unit having plural rows of display means. The preferred embodiment of the present invention provides means for displaying and entering alphabetical characters, other characters, and codes in a row plus numerals such as telephone numbers and symbols in another row by first displaying either the designated alphabetical characters or codes corresponding to digital keys in a row of the display unit, followed by pressing of the functional keys and the push-button dialer.

More specifically, using such a telephone unit provided with the push-button dialer and control means including microprocessors, the preferred embodiment of the present invention provides a display unit capable of sequentially displaying characters and codes split into plural groups; and input means incorporated in the push-button dialer comprising the shift-key function sequentially switching the character groups and functions for allowing the input of specific numerals corresponding to the desired characters for correctly selecting the designated characters.

BRIEF DESCRIPTION OF THE DRAWINGS

FIGS. 1 and 2 respectively show one of the preferred embodiments of the present invention incorporated in a telephone unit wherein FIG. 1 is a plan view showing the appearance of the telephone reflecting the preferred embodiment;

FIG. 2 is a simplified block diagram of the internal configuration of the preferred embodiment.

DETAILED DESCRIPTION OF THE PREFERRED EMBODIMENTS

Referring now to the attached drawings, configuration and functions of the telephone unit embodied by the present invention are described below.

Figure 1:
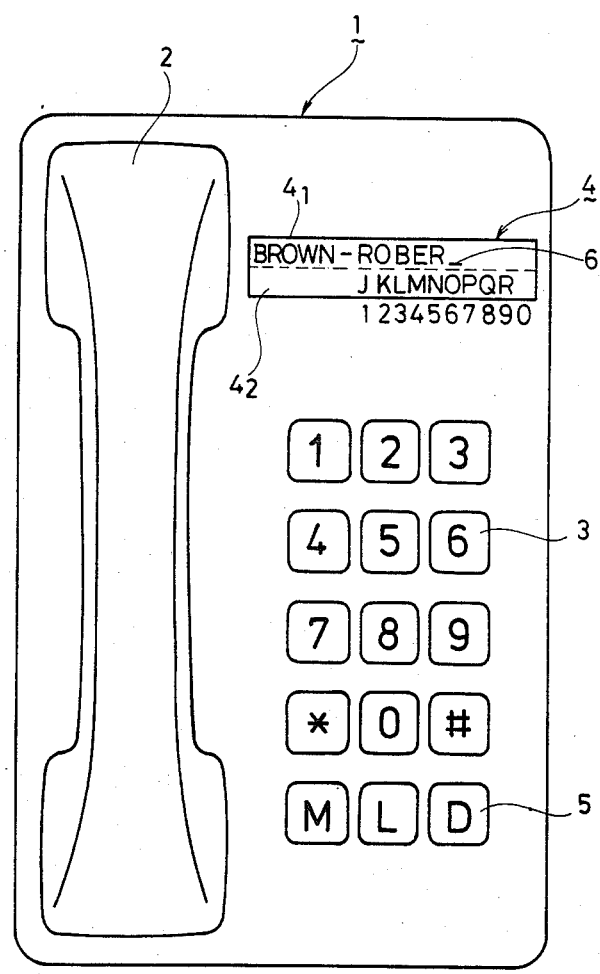
Figure 2:
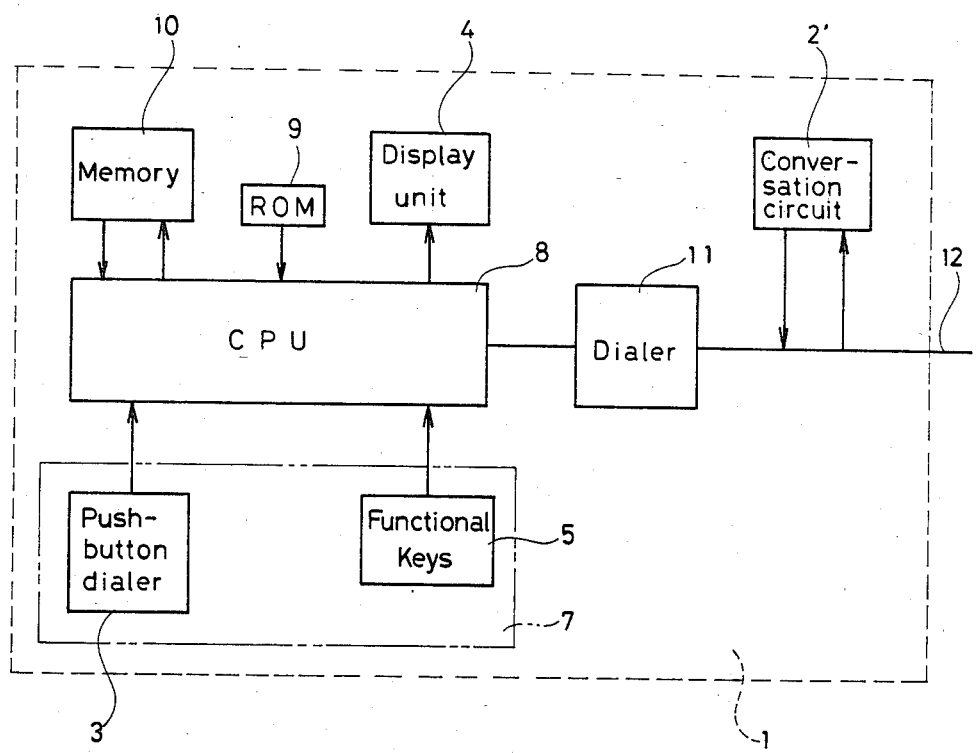

FIG. 1 is an overall appearance of the telephone unit incorporating one of the preferred embodiments of the present invention. The telephone unit 1 is provided with the transmitter/receiver unit 2, push-button dialer 3, display unit 4, and the function key 5, respectively. In this Figure, the telephohe embodied by the present invention features the provision of the display unit 4 which is comprised of the upper row $4_1$ and the lower row $4_2$ together with ten digits 1 through 9 and 0 that are located below the lower row $4_2$ and the functional key 5 in the bottom right corner. FIG. 2 is a simplified block diagram showing the internal configuration of the telephone embodied by the present invention. The telephone unit 1 comprises the conversation circuit 2 including the transmitter and the receiver, a key board 7 being the input device composed of the push-button dialer 3 and the functional keys 5, display unit 4, controller 8 incorporating a microprocessor CPU, ROM 9 storing a variety of programs for activating various functions of the telephone unit 1, memory 10 storing the registered content, and the dialer 11. These elements are connected to the telephone line via the communication line 12. Next, referring to FIGS. 1 and 2, the input procedure needed for registering personal names, company names, and telephone numbers into the telephone embodied by the present invention is described below.

Assume that the user needs to register the name of Brown Robert and his telephone number 0123-45-6789 in the telephone memory. When the user first presses the registration key M of the functional key 5, the system enters the register-enable status, and simultaneously, cursor 6 appears in the left end of the upper row $4_1$ of the display unit 4. At the same time, alphabetical characters A through I and symbol "." (period) appear in the lower row $4_2$ so that these exactly correspond to digits 1 through 0 provided below the display unit 4. Table 1 shows a typical example of the corresponding relationship between these digits and the alphabetical characters and symbols. The content of the presentation in the lower row $4_2$ corresponds to the first group shown in Table 1.

TABLE 1

| | | | | | | | | | | |
|---|---|---|---|---|---|---|---|---|---|---|
| First group | A | B | C | D | E | F | G | H | I | . |
| Second group | J | K | L | M | N | O | P | Q | R | — |

TABLE 1-continued

| Third group | S | T | U | V | W | X | Y | Z | . | — |
|---|---|---|---|---|---|---|---|---|---|---|
| Corresponding digits | 1 | 2 | 3 | 4 | 5 | 6 | 7 | 8 | 9 | 0 |

Now, when a digit 2 corresponding to B of the first group is input by pressing key 2 of the push-button dialer 3, the character B then appears in the left end of the upper row $4_1$ of the display unit 4 to cause cursor 6 to move to the right by one character lot. Next, when the key "#" having the shift-key function is pressed, the display content in the lower row $4_2$ varies the character array into those which are shown in the second group. In other words, whenever the shift key "#" is pressed, the display content in the lower row $4_2$ sequentially varies into those which are shown in the first or third group, thus allowing the user to optionally select any desired alphabetical characters and symbols. In this way, the user can sequentially select such character groups and numerals corresponding to characters R O W N following the first character B, symbol "-", and characters R O B E R T before entering these. In other words, using the shift key "#", the user should first select any of these character groups to input character R from the 9th position of the second group, character O from the 6th position of the second group, character W from the 5th position of the third group, character N from the 5th position of the second group, symbol "-" from the position of the second or third group, character E from the 5th position of the first group, and character T from the second position of the third group, respectively. These can be sequentially input by pressing the digital keys of the push-button dialer 3 to deal with the required characters and symbols (See FIG. 1). During these key operations, cursor 6 receives character signals and moves to the right whenever the input character is displayed. When the last character T has been input in the right end position of the upper row $4_1$ of the display unit 4, entry of the designated name is completed. Next, by pressing "*" key having the row-shift function, all the display content in the lower row $4_2$ disappears to allow the unit to enter the digit-entry enable status for the telephone number required. When the designated telephone number 0123-45-6789 has been input into the lower row $4_2$, registration of the needed data is now completed. Symbol "-" can be conveniently input between these numbers by pressing the shift key "#" when inputting the telephone number. After completing these operations, all the input data can be stored in memory 10 of FIG. 2 by repressing the registration key M.

When the user attempts to call up someone using the registered data in memory, he first presses the list key L which is one of the functional keys 5. Simultaneously, cursor 6 starts to flash itself at the extreme left end of the upper row $4_1$ of the display unit 4, whereas characters A through I and symbol "." appear in the lower row $4_2$ as was done when these were initially registered, thus the unit enters the list display status. Now, for example, when calling up Mr. Brown-Robert, the user first presses the digital key 2 of the push-button dialer corresponding to the initial character B of his name, and then all the personal and company names registered under the initial character B are sequentially displayed in the upper row $4_1$ of the display unit 4, whereas corresponding telephone numbers are also displayed in the lower row $4_2$ simultaneously. By continuously pressing the shift key "#", both the character array showing the personal and company names and the digital array showing corresponding telephone numbers will be sequentially displayed. Now, as soon as the character array Brown-Robert appears in the display, the user should then press the dial transmitter key D being one of the functional keys 5. This activates the telephone number shown in the lower row $4_2$, i.e., 0123-45-6789 is then transmitted by the dialer 11 to the telephone line via the communication line 12 shown in FIG. 2, thus eventually calling up the addressee's telephone. If the user merely wants to know the addressee's telephone number, he can achieve this by avoiding to press the dial transmission key D. When the user wants to list up the initial characters stored either in the second or third group of Table 1, as was done for the registration, by pressing the shift key "#", display content in the lower row $4_2$ of the display unit 4 varies into those which are shown either in the second or third group, thus allowing the user to select any of the initial character desired. As described earlier, since the registration and list-up display content is composed of character arrays and numeral arrays, the preferred embodiment not only registers and displays personal and company names and their telephone numbers, but it also effectively registers other necessary data such as names of banks, secret code numbers of the cash-service card, or account numbers so that these important data can be read out as required.

Figure 3A:
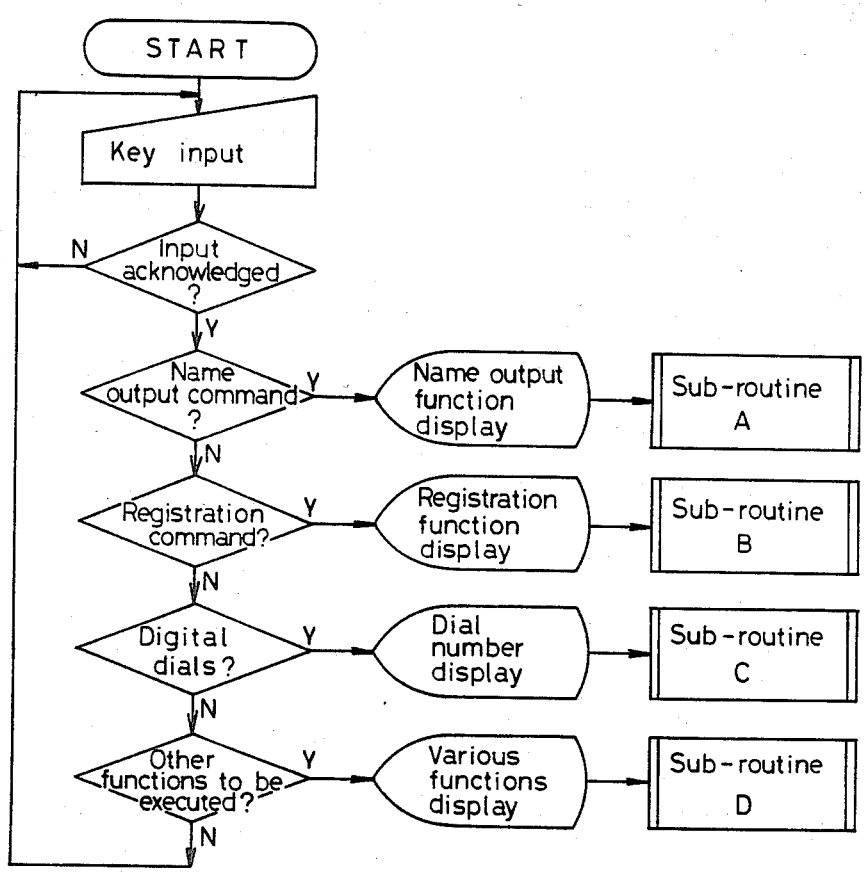
FIG. 3 (a), (b), (c) and (d) respectively show the flowcharts describing the operations reflecting typical functions of the telephone unit incorporating the preferred embodiment.
Figure 3:
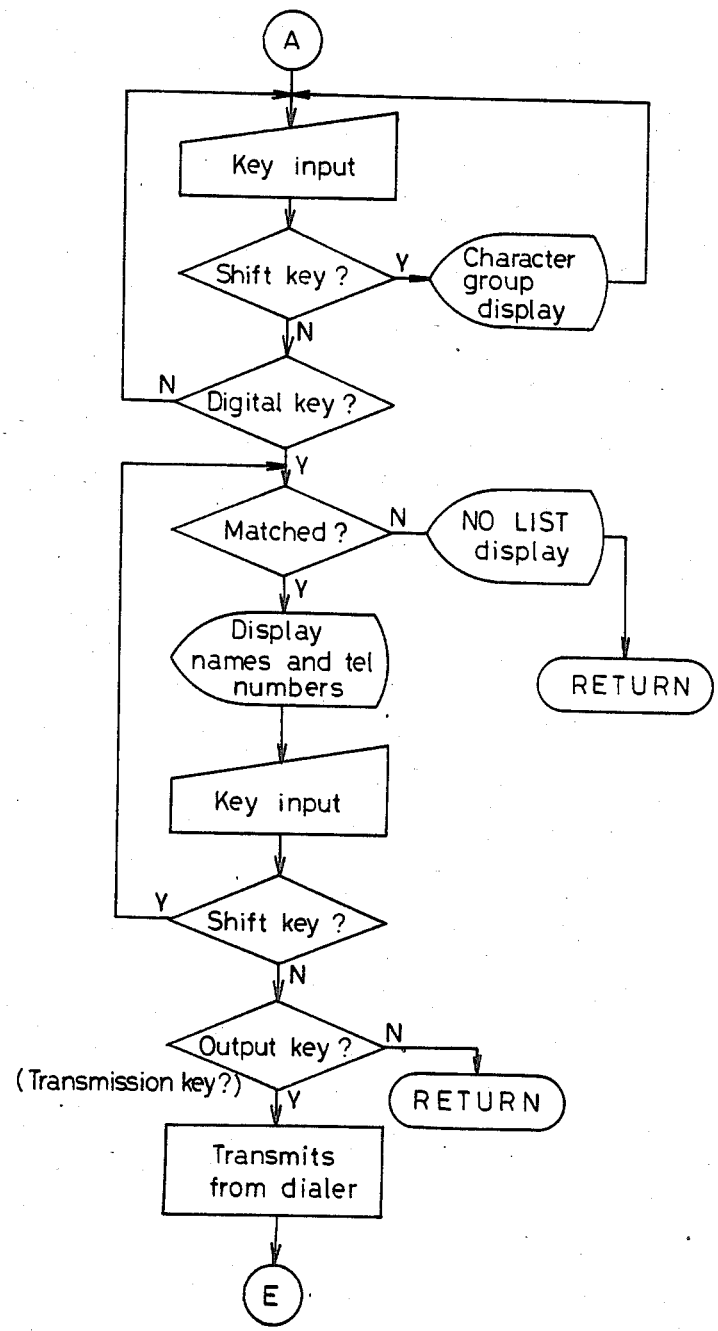
Figure 3C:
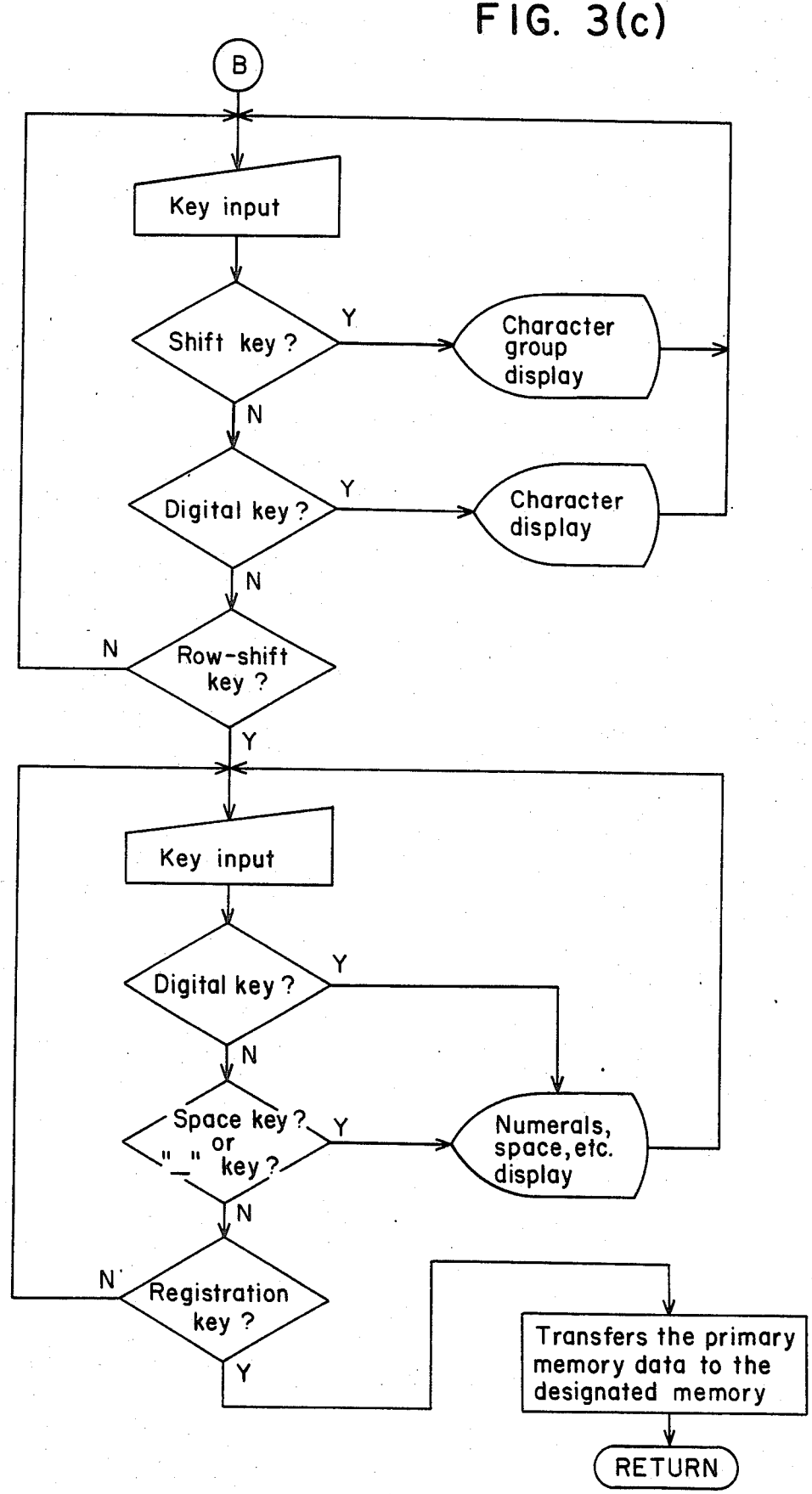
Figure 3D:
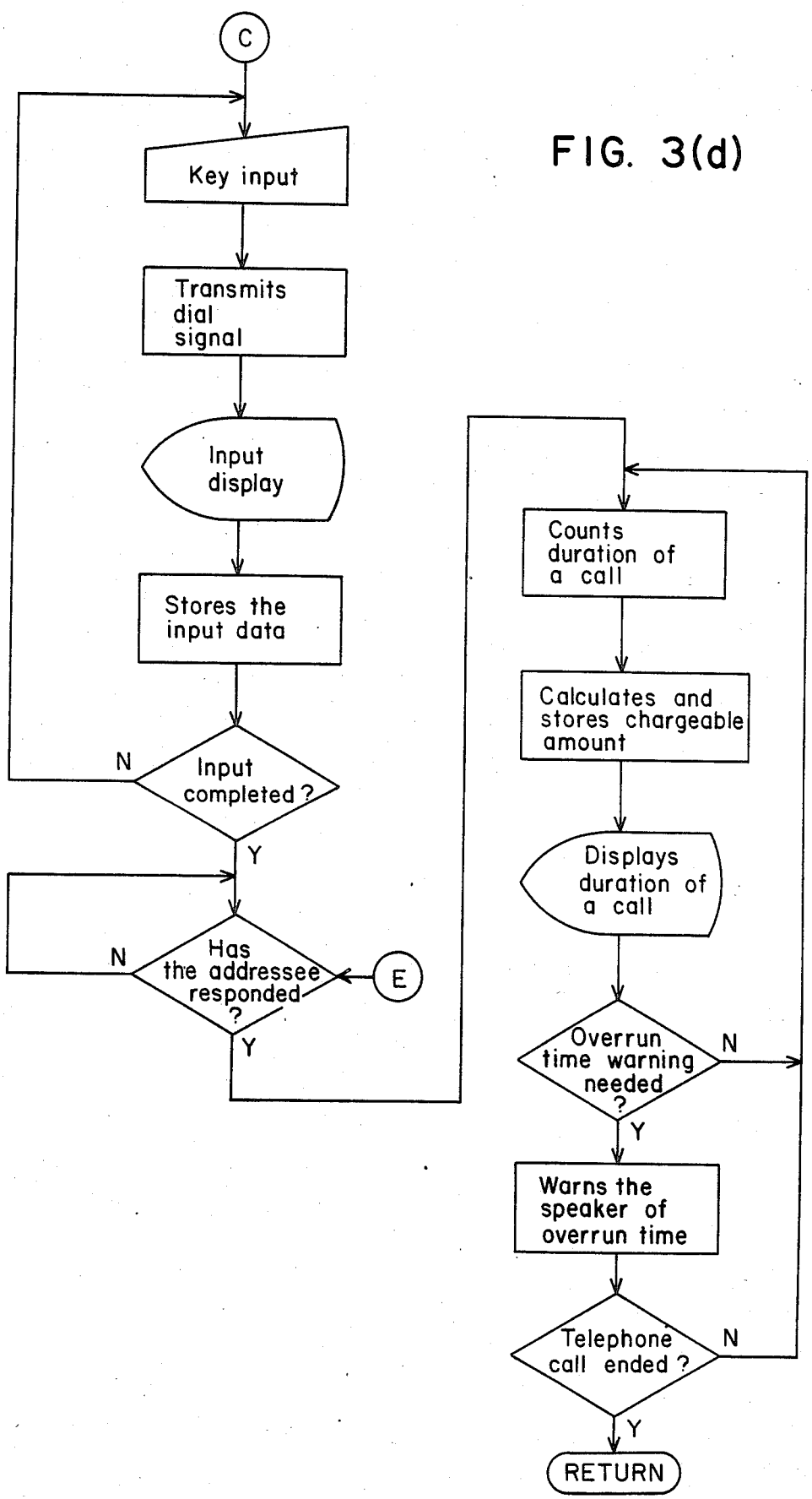

Next, referring now to the flowcharts shown in FIG. 3 (a), (b), (c), and (d), the preferred embodiment related to the control programs for executing the above operations is described below. FIG. 3 (a) shows the procedure needed for identifying the input content. The controller identifies the following on receipt of any input data; (A) If it is an instruction from the CPU to read the addressee's name to transmit dialing signals according to the stored telephone number; (B) if it is an instruction from the CPU to input the data for registration; (C) if it is an instruction to call up a specific addressee by normally pressing the push-button dialer 3; or (D) if it is an instruction to execute any other functions. After correctly identifying the data content, the controller instructs the entire unit to execute operations in response to respective input data. If the input data corresponds to the content (A), the entire unit enters the operation shown in FIG. 3 (b). If the input data corresponds to the content (B), such operations shown in FIG. 3 (c) will be activated. If the input data corresponds to the content (C), such operations shown in FIG. 3 (d) will be activated. Although not shown in the flowchart, if the input data corresponds to the content (D), the unit will perform specific operations in response to a variety of functions. FIG. 3 (b) shows such operations for reading the registered name from the list and after finding the designated name, the telephone controller instructs the dialer to transmit the stored telephone number of the designated addressee to call up the addressee's telephone. First, by performing operations shown in FIG. 3 (a), the CPU identifies whether it has been instructed to transmit the name data or read the list. In other words, as soon as the CPU identifies that the list key L of the functional keys 5 has been pressed ON, and if the shift key "#" has been pressed next, the CPU then varies the display content in the lower row $4_2$ of the display unit 4 into the next group display content shown in Table 1. When the digital keys are pressed next, the memory content of the registered character row containing the initial character corresponding to the digit is activated, in other words, the registered content is then displayed in the display unit 4. When the shift key "#" is pressed, memory contents are sequentially displayed, and when the transmission key D of the functional keys 5 is pressed after locating the designated name, dialer 11 transmits the dial signal containing the registered telephone number, and then calls up the addressee's telephone. If the needed telephone number is not yet registered, "NO LIST" will be displayed to reset the entire operation to the initial mode.

FIG. 3 (c) shows such operations needed for registration. As soon as the registration key M has been pressed during the operation designated in FIG. 3 (a), the character row is input. The CPU then identifies whether the shift key "#" has been pressed next or the digital keys are being pressed next. If the shift key "#" is pressed, the display content in the lower row $4_2$ of the display unit 4 will be switched. If any of the digital keys has been pressed, either a character or a symbol corresponding to the activated digit is then displayed in the upper row $4_1$, while this display content remains until the row-shift key "*" is pressed. After completing the input of the needed character row and the row-shift key "*" is pressed, the unit enters the digital row input enable mode, and then the needed digits can be displayed in the lower row $4_2$ of the display unit 4 in response to the activated digital keys, space key, and "-" key. Finally, when the registration key M is pressed again, the effect of registration is input. The CPU then causes memory unit 10 to store the character and digital rows displayed in the upper row $4_1$ and the lower row $4_2$ of the display unit 4, thus completing the entire registration.

FIG. 3 (d) shows such operations when calling up a specific addressee by normally pressing the push-button dialer using a telephone that combines the conventional function and the new function embodied by the present invention. As soon as the needed digital keys of the push-button dialer 3 have been pressed, the CPU causes the dial signal to be transmitted to the telephone line and the display unit 4 to display its telephone number and memory 10 to store this data. After fully dialing the needed number to call up the addressee and the conversation begins, the CPU counts the duration of a call via the time register and calculates the charge for entry into memory 10. In addition, the controller causes the duration of a call to be digitally displayed, and if the duration of this call exceeds the preset time, the unit warns the caller of the overrun time by flashing an LED or by other appropriate means. These operations can also be performed when making a call using the registered telephone number shown in FIG. 4 (b). As a result, by performing these operations, both the addressee's telephone number and the chargeable amount can be stored in memory as the record data, which can be output as required.

The preferred embodiment thus far described merely refers to part of its useful functions available in variety. For example, as one of other useful functions, it is also possible to provide the telephone unit with such a function capable of automatically calling up a specific addressee again a short while after making the first call when the addressee's line was busy, or such a function enabling both parties to talk over the telephone without lifting the transmitter/receiver unit. Available characters are not constrained only to the alphabet, but either the "HIRAGANA" or "KATAKANA" Japanese characters each having a maximum of 50 characters may also be input. These can be displayed by 5 groups each containing 10 characters. In the present description, the preferred embodiment has been introduced to a telephone unit. However, the preferred embodiment can also be effectively applied to individual dialers.

As is clear from the foregoing detailed description, the telephone unit incorporating the preferred embodiment of the present invention executes the entry operations of character rows by activating the shift key "#" in the pushbutton dialer and the digital keys so that the desired characters can be securely input by pressing a specific number corresponding to a desired character. Therefore, depending on the names, a plurality of characters can be input using a single round of the character group display and by operating a specific digital key. In addition, since any of the character groups can be easily selected by continuously pressing a specific key, for example, the shift key "#", entry of the needed data can be easily done for its registration. Such a special keyboard can also be realized easily by adding several functional keys to the push-button dialer provided for any of the conventional push-button telephones. As a result, the preferred embodiment effectively permits input and registration of the needed data including character rows without enlarging the dimensions of the telephone units.

What is claimed is:

1. A telephone having a memory for storing telephone numbers and proper names related to each telephone number, and input means for introducing said telephone numbers and proper names into said memory, an improvement in said input comprising:
   keyboard mens including a plurality of keys consisting only of numeric keys and function keys;
   display means for displaying information input by said keys;
   said memory having stored therein alphabetic character data capable of generating all characters of an alphabet from which said proper names shall be formed;
   nonactuable indicia adjacent a portion of said display means including a side-by-side array of numbers corresponding to each of the numbers of said numeric keys;
   selection means for retrieving from said memory alphabetic characters data for generating on said display means selected groups of characters from the alphabet, the number of characters in said group being no greater than the number of side-by-side numbers in said array, said display means displaying the selected group on said portion of said display means in visual alignment with said numbers on said array in a one-to-one correspondence therewith, said nonactuable indicia permitting cross-referencing between said portion of said display means and said key having the number corresponding to the indicia; and
   control means for inputting a selected alphabetic character from the selected group into said memory in response to actuation of the numeric key bearing the number in said array which is aligned in one-to-one correspondence with the selected alphametic character in the group of characters displayed on said adjacent portion of the display means.

2. A telephone according to claim 1, wherein said display means includes an upper display unit for displaying said proper names and a lower display unit for displaying one of said selected groups of characters from the alphabet and said corresponding telephone numbers.

3. A telephone according to claim 1, wherein the selected groups of characters from the alphabet are groups corresponding to letters A–I, J–R, and S–Z, respectively.

4. A telephone according to claim 1, wherein said control means for inputting a selected alphabetic character includes an asterisk key from said keyboard means, said selected alphabetic characters being input following actuation of said asterisk key.

5. A telephone according to claim 1, wherein said means for introducing a telephone number includes a pound key from said keyboard means, said telephone number being introduced into said memory by said numeric keys following actuation of said pound key.

* * * * *